Patented June 23, 1925.

1,543,569

UNITED STATES PATENT OFFICE.

JOHANN HUISMANN, OF WIESDORF, NEAR COLOGNE, WALTER DUISBERG, OF LEVER-KUSEN, NEAR COLOGNE, AND WINFRIED HENTRICH AND LUDWIG ZEH, OF WIES-DORF, NEAR COLOGNE, GERMANY, ASSIGNORS TO GRASSELLI DYESTUFF COR-PORATION, OF NEW YORK, N. Y., A CORPORATION OF DELAWARE.

AMINOALKYLAMINONAPHTHALENE SULPHONIC ACIDS.

No Drawing.   Application filed March 6, 1925.   Serial No. 13,610.

*To all whom it may concern:*

Be it known that we, (1) JOHANN HUIS-MANN, (2) WALTER DUISBERG, (3) WIN-FRIED HENTRICH, and (4) LUDWIG ZEH, citizens of Germany, residing at (1) Wiesdorf, near Cologne, (2) Leverkusen, near Cologne, (3) and (4) Wiesdorf, near Cologne, State of Prussia, Germany, have invented new and useful Improvements in Aminoalkyl-aminonaphthalene Sulphonic Acids, of which the following is a specification.

Our invention resides in a process of producing ω-aminoalkyl-substituted aminonaphthalene sulphonic acids and in the compounds themselves, which are valuable dyestuff intermediates.

It is well known that by reacting with primary or secondary amines in presence of alkali metal bisulfites upon naphthols or naphthylamines the corresponding alkyl-naphthylamines are obtained. If aliphatic diamines such as ethylenediamine, or its homologues are allowed to react with the naphthols both amino groups are liable to be substituted and mixtures of i. e. amino-ethylamidonaphthalene, ethylenedinaph-thylamines and eventually higher alkylated products are obtained.

We have now found that if aliphatic diamines are allowed to react in presence of soluble salts of sulfurous acid upon naphthalene sulphonic acids having one of the reactive groups, amino and hydroxyl, only one of the amido groups is substituted by a naphthalene nucleus, and ω-aminoalkylami-nonaphthalene sulphonic acids are obtained with excellent yields.

The reaction proceeds most likely in the following way—

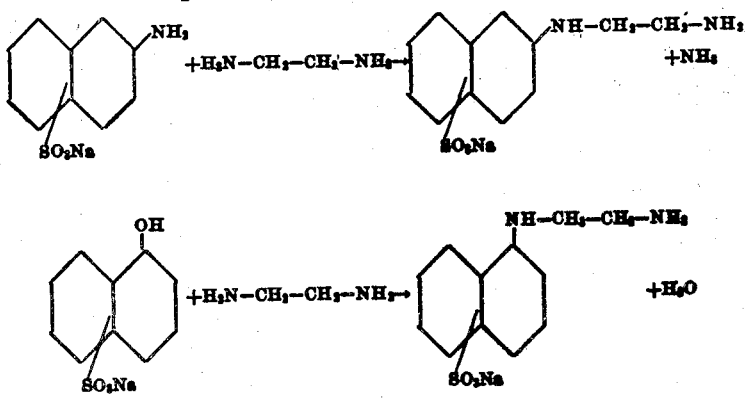

In the foregoing formulæ the sulphonic acid group may occupy any of the several possible positions in the naphthalene nucleus as indicated. Both types of naphthalene sulphonic acids, that is, those having the reactive group in the alpha position and those having the reactive group in the beta position react with aliphatic diamines in the same way, corresponding naphthol sulphonic acids and naphthylamine sulphonic acids giving the same end product.

In addition to the straight naphthol and naphthylamine sulphonic acids, aminonaph-thol-, dihydroxy-naphthalene- as well as naphthylene-diamine-sulphonic acids will form ω-aminoalkyl bodies, The diamines which we use for the production of our amino-alkylamino-naphtha-lene sulphonic acids are preferably the aliphatic diamines, such as ethylene-diamine, propylene diamine, butylene-diamine, etc.

These new ω-amino-alkyl-amino-naphtha-lene-sulphonic acids are generally white to greyish white powders generally difficultly soluble in water. They form alkali metal salts, of which the sodium salts are usually better soluble than the free acids. They are soluble in dilute mineral acids. With nitrous acid they form colored crystalline characteristic nitroso compounds, which can be used for their identification.

Our invention is further illustrated by the following examples in which the parts given are by weight:—

*Example 1.*—246 parts of 1-naphthol-4-sulphonate of soda are suspended in 880 parts of a 40% sodium bisulfite solution to which 450 parts of a 20% aqueous solution of ethylene-diamine are added and the mixture is boiled at reflux with good stirring. The naphthol sulphonic acid dissolves gradually. At the same time the 1-(aminoethyl)-amino-naphthalene-4-sulphonic acid separates. The reaction is carried out at boiling temperature for several hours. The mixture is then cooled and filtered on a vacuum filter. The mother liquor is practically free from raw material and from the desired end product. The separated product is sludged with water and boiled with hydrochloric acid in order to expel all the sulphurous acid from the bisulfite. By cooling, the aminoethyl-naphthionic acid separates and is filtered off. It is a light greyish powder very difficultly soluble even in hot water. It forms a sodium salt which is soluble to a certain extent in hot water but also difficultly soluble in cold water. Suspended in water and treated with sodium nitrite and hydrochloric acid a nitroso compound is quantitatively formed which nitroso compound is a crystalline yellowish colored powder relatively soluble in water.

*Example 2.*—246 parts of 2-naphthylamine-7-sulphonate of soda are suspended in 1750 parts of a 40% sodium bisulfite solution to which 900 parts of a 20% aqueous solution of ethylenediamine are added and the mixture is boiled at reflux for 12 hours while stirring. The napthylamine sulphonic acid dissolves gradually and then the 2-(aminoethyl)-aminonaphthalene-7-sulphonic acid starts to separate. After cooling, the crystalline product is filtered off, sludged with hydrochloric acid to Congo acid reaction and boiled to expel the sulfurous acid. After cooling, the pure 2-(aminoethyl)-aminonaphthalene-7-sulphonic acid is filtered off and dried. It is a white powder practically insoluble in cold and hot water, the sodium salt is slightly soluble in hot water and very difficultly soluble in cold water. The nitroso compound is obtained by dissolving the sodium salt in hot water, adding the molecular equivalent of sodium nitrite and pouring the solution into ice cold diluted hydrochloric acid. The nitroso compound separates as beautiful orange colored crystals quite insoluble in cold water and soluble in hot water from which it can be re-crystallized.

*Example 3.*—261 parts of 2-amido-8-naphthol-6-sulphonate of soda are suspended in 1750 parts of a 40% sodium bisulfite solution to which 300 parts of a 20% aqueous solution of ethylenediamine are added. The mixture is boiled at reflux for 12 hours, cooled, filtered off and the paste suspended in enough hydrochloric acid to secure Congo acid reaction at the end and, by boiling, all the sulfurous acid is expelled. The 2-(aminoethyl)-amino-8-naphthol-6-sulphonic acid is obtained with an excellent yield. It is a white powder difficultly soluble in water but quite soluble in hot diluted hydrochloric acid. With nitrous acid it forms a brownish crystalline nitroso compound.

*Example 4.*—364 parts 2.8-dihydroxynaphthalene-3.6-disulphonate of soda are suspended in 880 parts of a 40% sodium bisulfite solution and 300 parts of a 20% aqueous solution of ethylenediamine and the mixture is boiled at reflux for 60 hours. The solution is then diluted with its volume of water and boiled with an excess of hydrochloric acid. After cooling the 2-(aminoethyl)-amino-8-hydroxynaphthalene-3.6-disulphonic acid is filtered off. It contains traces of unconverted 2.8-dihydroxynaphthalene-3.6-disulphonic acid and ethylene-2.2'-diamino-8.8'-dihydroxydinaphthyl-3.3'-6.6'-tetrasulphonic acid. It is purified by recrystallization from hot water to which sodium acetate has been added. It is a whitish powder easily soluble in hot water.

*Example 5.*—246 parts 2-naphthylamine-7-sulphonate of soda are dissolved in 500 parts water and 880 parts of a 40% sodium bisulfite solution added. To this is added a solution of 241 parts normal butylene-diamine-dichlorhydrate in 500 parts water and the mass heated at 90–95° for about 16 hours. The ω-amino-butyl-2-naphthylamine-7-sulphonic acid separates as white floccules. After cooling, the reaction product is filtered, the sulphonic acid dissolved in water and boiled with an excess of hydrochloric acid to expel the sulfurous acid. The solution is then made slightly alkaline by the addition of soda ash. The difficultly soluble sodium salt of the ω-aminobutyl-2-naphthylamine-7-sulphonate of soda separates, is filtered off and dried. It is a white powder easily soluble in dilute hydrochloric acid; with sodium nitrite in acid solution it forms a crystalline light yellow colored nitroso compound.

We claim:—

1. The process of producing ω-aminoalkyl-amino-naphthalene sulphonic acids which consists in reacting with aliphatic diamines in presence of soluble salts of sulfurous acid upon naphthalene sulphonic acids having at least one of the reactive groups amino and hydroxyl.

2. The process of producing ω-aminoalkyl-amino-naphthalene sulphonic acids which consists in reacting in presence of soluble salts of sulfurous acid with aliphatic diamines upon naphthylamine sulphonic acids.

3. The process of producing ω-aminoethyl-amino-naphthalene sulphonic acids which consists in reacting with ethylene-diamine in presence of soluble salts of sulfurous acid upon naphthalene sulphonic acids having at least one of the reactive groups amino and hydroxyl.

4. The process of producing ω-aminoethylamino-naphthalene sulphonic acids, which consists in reacting with ethylenediamine in presence of soluble salts of sulfurous acid upon naphthylamine sulphonic acids.

5. As new products the ω-aminoalkyl-aminonaphthalene sulphonic acids which can be obtained by acting with aliphatic diamines in presence of soluble salts of sulfurous acids upon naphthalene sulphonic acids having at least one of the reactive groups amino and hydroxyl, which ω-amino-alkylamino-naphthalene sulphonic acids are whitish powders generally difficultly soluble in water, form alkali metal salts, are soluble in dilute mineral acids and form characteristic, crystalline and colored nitroso compounds.

6. As new products the ω-aminoethylaminonaphthalene sulphonic acids which can be obtained by reacting with ethylenediamine in presence of soluble salts of sulfurous acid upon naphthalene sulphonic acids having at least one of the reactive groups amino and hydroxyl, which ω-aminoethylamino-naphthalene sulphonic acids are white powders, generally difficultly soluble in water and form alkali metal salts, soluble in dilute mineral acids and characteristic, colored and crystalline nitroso compounds.

In testimony whereof we have hereunto set our hands.

JOHANN HUISMANN.
WALTER DUISBERG.
WINFRIED HENTRICH.
LUDWIG ZEH.